United States Patent
Itou et al.

(10) Patent No.: US 10,410,763 B2
(45) Date of Patent: Sep. 10, 2019

(54) WIRE HARNESS HAVING A WATERPROOFING AGENT

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Kenji Itou, Yokkaichi (JP); Takashi Takada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/094,824

(22) PCT Filed: Apr. 11, 2017

(86) PCT No.: PCT/JP2017/014804
§ 371 (c)(1),
(2) Date: Oct. 18, 2018

(87) PCT Pub. No.: WO2017/187964
PCT Pub. Date: Nov. 2, 2017

(65) Prior Publication Data
US 2019/0096543 A1    Mar. 28, 2019

(30) Foreign Application Priority Data
Apr. 27, 2016    (JP) .................................. 2016-089679

(51) Int. Cl.
*H01B 7/282* (2006.01)
*H01R 4/70* (2006.01)
(Continued)

(52) U.S. Cl.
CPC .......... *H01B 7/282* (2013.01); *B60R 16/0207* (2013.01); *H01B 7/0045* (2013.01);
(Continued)

(58) Field of Classification Search
CPC ...... H02G 15/08; H02G 15/007; H02G 15/18; H01B 7/00; H01B 7/282; H01B 7/0045; H01R 4/70; B60R 16/0215
(Continued)

(56) References Cited

U.S. PATENT DOCUMENTS 4,822,434 A * 4/1989 Sawaki ............... B29C 35/0888
156/275.5
4,863,535 A * 9/1989 More ....................... H01R 4/70
156/49
(Continued)

FOREIGN PATENT DOCUMENTS

JP    2012-248527 A    12/2012
JP    2013-004411 A    1/2013
(Continued)

OTHER PUBLICATIONS

May 16, 2017 International Search Report issued in International Patent Application No. PCT/JP2017/014804.

*Primary Examiner* — Andargie M Aychillhum
*Assistant Examiner* — Michael F McAllister
(74) *Attorney, Agent, or Firm* — Oliff PLC (57) ABSTRACT

Provided is a wire harness in which waterproofness of an exposed conductor portion can be ensured, and even when at least one of insulated wires is exposed to a high temperature, a rubber stopper of a waterproofing terminal can be
(Continued)

kept from coming off. An outer peripheral surface of an exposed conductor portion where partially exposed conductors of a plurality of insulated wires are joined together, and outer peripheral surfaces of coating material end portions adjacent to the exposed conductor portion, is continuously covered with a waterproofing agent. A gap between adjacent insulated wires is sealed with the waterproofing agent at the coating material end portions adjacent to the exposed conductor portion. At least one insulated wire of the plurality of insulated wires has a flow path through which gas flows, the flow path being created in gaps between strands that constitute a conductor of the insulated wire.

5 Claims, 3 Drawing Sheets (51) Int. Cl.
  H02G 15/007 (2006.01)
  H02G 15/18 (2006.01)
  H01B 7/00 (2006.01)
  H02G 3/04 (2006.01)
  H02G 15/00 (2006.01)
  B60R 16/02 (2006.01)

(52) U.S. Cl.
  CPC ............ *H01R 4/70* (2013.01); *H02G 3/0406* (2013.01); *H02G 15/003* (2013.01); *H02G 15/007* (2013.01); *H02G 15/18* (2013.01); *B60R 16/0215* (2013.01); *Y02A 30/14* (2018.01)

(58) Field of Classification Search
  USPC .......................................................... 174/21 R
  See application file for complete search history.

(56) References Cited

U.S. PATENT DOCUMENTS

| 5,099,088 | A | * | 3/1992 | Usami | H01R 4/22 |
| | | | | | 156/49 |
| 5,399,810 | A | * | 3/1995 | Hayami | H01R 4/70 |
| | | | | | 156/49 |
| 6,303,865 | B1 | * | 10/2001 | Yamamoto | H01R 4/70 |
| | | | | | 174/17.08 |
| 7,572,979 | B2 | * | 8/2009 | Otsuki | H01R 13/5213 |
| | | | | | 174/84 R |
| 8,740,223 | B1 | * | 6/2014 | Alpi | H02G 3/0481 |
| | | | | | 277/312 |
| 2012/0318576 | A1 | | 12/2012 | Koto | |
| 2014/0299353 | A1 | * | 10/2014 | Saito | H01B 7/282 |
| | | | | | 174/113 R |
| 2015/0096786 | A1 | * | 4/2015 | Takasu | B32B 7/02 |
| | | | | | 174/145 |

FOREIGN PATENT DOCUMENTS

| JP | 5418457 B2 | 2/2014 |
| JP | 2015-159070 A | 9/2015 |

* cited by examiner

WIRE HARNESS HAVING A WATERPROOFING AGENT

TECHNICAL FIELD

The present disclosure relates to a wire harness, and more particularly relates to a wire harness in which a splice portion where conductors exposed from insulated wires are joined together is covered with a waterproofing agent and thereby waterproofed.

BACKGROUND ART

In an in-vehicle wire harness, for example, there are cases where conductors of insulated wires are partially exposed at intermediate portions or the like of the insulated wires, and the exposed conductors are joined together to form a splice portion. The thus formed splice portion is covered and protected with a resin material.

CITATION LIST

Patent Documents

Patent Document 1: Japanese Patent No. 5418457

SUMMARY

Technical Problem

When the exposed conductor portion formed of a bundle of exposed conductors including the splice portion is covered with a resin material, the resin material penetrates into gaps between strands constituting these conductors. When the resin material completely penetrates into the gaps between the strands, the intrusion of water into the exposed conductor portion from a connecting terminal side via the inside of coating materials of the conductors can also be prevented. Thus, the waterproofing effect is increased even more. Therefore, in view of the waterproofing effect, usually, the resin material is allowed to fully penetrate into the gaps between the strands constituting the conductors. However, as a result of the gaps between the strands that constitute the conductors being filled with the resin material, air inside the coating materials is cut off from escaping to the exposed conductor portion. If at least one of the insulated wires included in such a wire harness is exposed to a high temperature, the air inside the coating material expands. Due to being cut off from escaping to the exposed conductor portion, the expanded air moves toward the connecting terminal opposite to the exposed conductor portion, and thus, a rubber stopper of a waterproofing terminal may come off due to pressure applied by the expanded air, resulting in a waterproofing failure.

To address the above-described problem, an object of certain aspects of some embodiments is to provide a wire harness in which waterproofness of the exposed conductor portion can be ensured, and, even when at least one of the insulated wires is exposed to a high temperature, the waterproofing rubber stopper of the connecting terminal can be kept from coming off, so that reliable waterproofing can be achieved independently of the environment in which the actual vehicle is driven.

Solution to Problem

To address the above-described problem, a wire harness according to a preferred embodiment a wire harness having a waterproofing structure in which an outer peripheral surface of an exposed conductor portion including a splice portion where partially exposed conductors of a plurality of insulated wires are joined together and being formed of a bundle of the exposed conductors of the plurality of insulated wires, and outer peripheral surfaces of coating material end portions adjacent to the exposed conductor portion, of the insulated wires are continuously covered with a waterproofing agent, wherein a gap between adjacent insulated wires of the plurality of insulated wires is sealed with the waterproofing agent at the coating material end portions adjacent to the exposed conductor portion, and at least one insulated wire of the plurality of insulated wires has a flow path through which gas flows, the flow path being created in gaps between strands that constitute the conductor of the insulated wire and reaching from a coating material end portion opposite to the coating material end portion adjacent to the exposed conductor portion to the splice portion.

At this time, it is preferable that at least one insulated wire of the plurality of insulated wires is an insulated wire whose conductor partially exposed at an intermediate portion of the wire in its longitudinal direction is joined to the exposed conductor of another insulated wire in the splice portion, and the insulated wire has a flow path through which gas flows, the flow path being created in gaps between strands that constitute the conductor and reaching from one end to another end of the wire in the longitudinal direction.

Moreover, it is preferable that two or more insulated wires of the plurality of insulated wires each have a flow path through which gas flows, the flow path being created in gaps between strands that constitute the conductor of the insulated wire and reaching from a coating material end portion opposite to the coating material end portion adjacent to the exposed conductor portion to the splice portion.

Moreover, it is preferable that a film-like or tubular protective material is disposed over the entire outer periphery of the waterproofing agent continuously covering the outer peripheral surface of the exposed conductor portion and the outer peripheral surfaces of the coating material end portions adjacent to the exposed conductor portion, of the insulated wires in a state in which the protective material is in close contact with the waterproofing agent.

Moreover, it is preferable that the waterproofing agent is formed of a cured product of a photo-curable resin.

Effects

With the wire harness according to a preferred embodiment, the outer peripheral surface of the exposed conductor portion and the outer peripheral surfaces of the coating material end portions adjacent to the exposed conductor portion, of the insulated wires are continuously covered with the waterproofing agent, and the gap between adjacent insulated wires of the plurality of insulated wires is sealed with the waterproofing agent at the coating material end portions adjacent to the exposed conductor portion. Thus, the intrusion of water into the exposed conductor portion from outside the protective material can be suppressed, so that waterproofing properties are ensured. Moreover, at least one insulated wire of the plurality of insulated wires has a flow path through which gas flows, the flow path being created in the gaps between the strands that constitute the conductor and reaching from the coating material end portion opposite to the coating material end portion adjacent to the exposed conductor portion to the splice portion. Thus, air inside the coating material of this insulated wire has an escape route to the exposed conductor portion. Accordingly, even when this insulated wire is exposed to a high temperature, the air inside the coating material flows to the exposed conductor portion, and a waterproofing failure caused by a rubber stopper of a waterproofing terminal coming off due to pressure applied by expanded air moving toward a connecting terminal opposite to the exposed conductor portion can be suppressed.

At this time, when at least one insulated wire of the plurality of insulated wires is an insulated wire whose conductor partially exposed at an intermediate portion of the wire in its longitudinal direction is joined to the exposed conductor of another insulated wire in the splice portion, and the insulated wire has a flow path through which gas flows, the flow path being created in the gaps between the strands that constitute the conductor of the insulated wire and reaching from one end to the other end of the wire in the longitudinal direction, even when the insulated wire is exposed to a high temperature, air inside the coating material flows to a portion of the insulated wire that is not exposed to the high temperature. Thus, a waterproofing failure caused by a rubber stopper of a waterproofing terminal coming off due to pressure applied by expanded air moving toward a connecting terminal opposite to the exposed conductor portion can be suppressed even more.

Furthermore, when two or more insulated wires of the plurality of insulated wires each have a flow path through which gas flows, the flow path being created in the gaps between the strands that constitute the conductor and reaching from the coating material end portion opposite to the coating material end portion adjacent to the exposed conductor portion to the splice portion, even when one insulated wire is exposed to a high temperature, air inside the coating material of this insulated wire flows to the inside of the coating material of another insulated wire whose flow path is connected to the flow path of the insulated wire exposed to the high temperature. Thus, a waterproofing failure caused by a rubber stopper of a waterproofing terminal coming off due to pressure applied by expanded air moving toward a connecting terminal of this insulated wire that is opposite to the exposed conductor portion can be suppressed even more.

Furthermore, when the film-like or tubular protective material is disposed over the entire outer periphery of the waterproofing agent, which continuously covers the outer peripheral surface of the exposed conductor portion and the outer peripheral surfaces of the coating material end portions adjacent to the exposed conductor portion, of the insulated wires in a state in which the protective material is in close contact with the waterproofing agent, the waterproofing agent can be easily disposed at a desired position, and the intrusion of water from outside the coating materials to the exposed conductor portion can be suppressed even more.

Furthermore, when the waterproofing agent is formed of a cured product of a photo-curable resin, since the photo-curable resin can be instantaneously cured through irradiation with light, the resin material can be intentionally prevented from penetrating into the gaps between the strands constituting the conductors, and a flow path through which gas flows can be secured in the gaps between the strands constituting the conductors.

DESCRIPTION OF EMBODIMENTS

Figure 1:
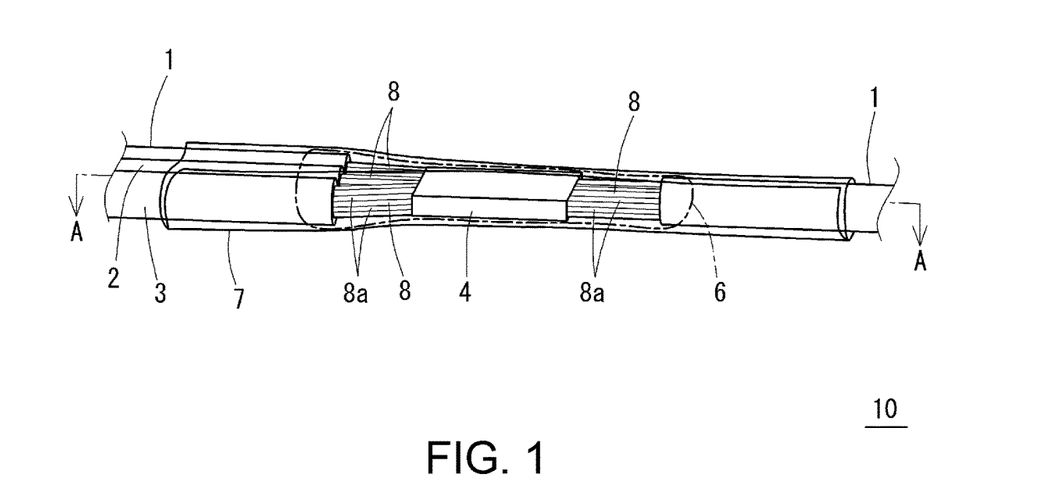
FIG. 1 is a perspective view showing an appearance of an intermediate splice portion and its neighboring portions of a wire harness according to an embodiment.
Figure 2:
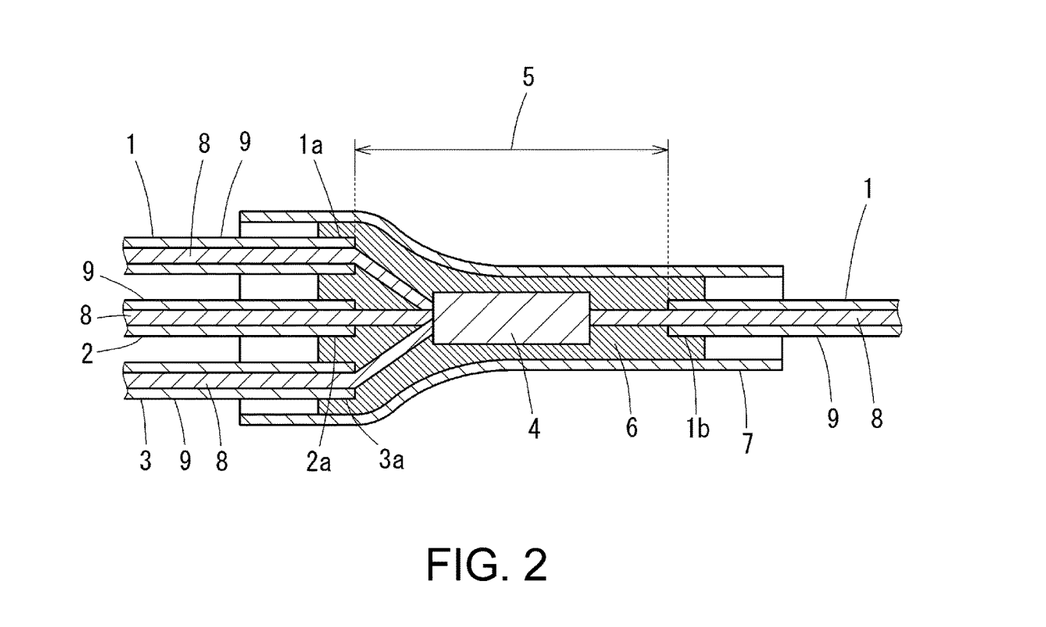
FIG. 2 is a horizontal cross-sectional view taken along line A-A in FIG. 1.
Figure 3A:
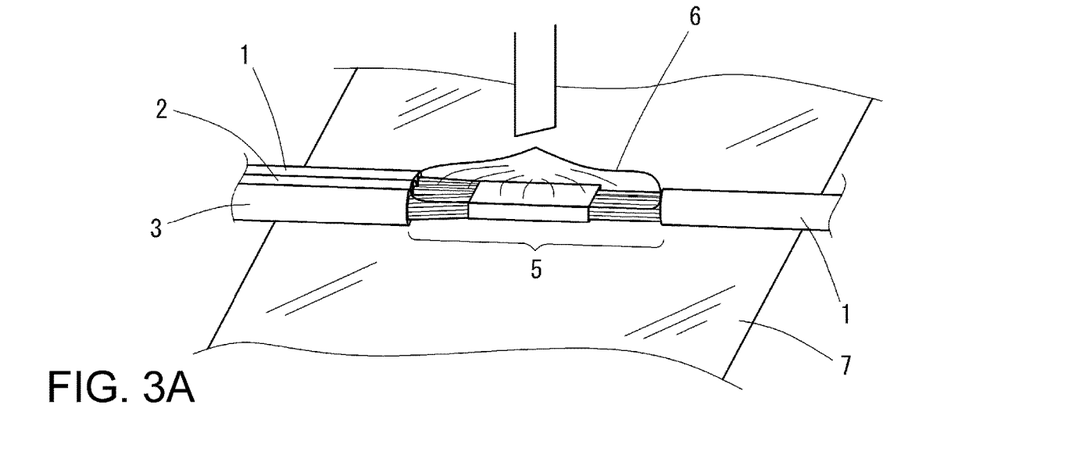
FIGS. 3(a)-3(c) show explanatory diagrams illustrating an example of a method for producing the wire harness in FIG. 1.
Figure 3B:
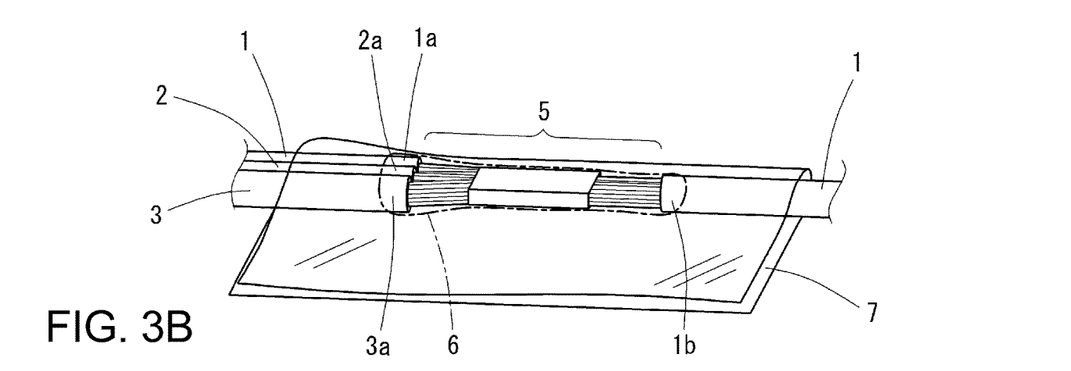
Figure 3C:
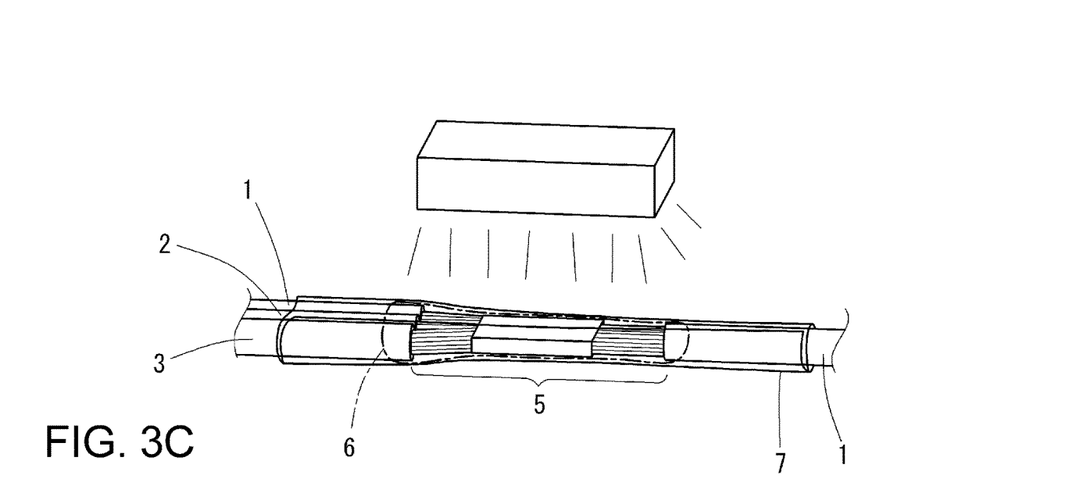

Next, an embodiment will be described in detail. FIG. 1 is a perspective view showing an appearance of a splice portion and its neighboring portions of a wire harness according to an embodiment. FIG. 2 is a horizontal cross-sectional view taken along line A-A in FIG. 1. FIGS. 3(a)-3(c) show explanatory diagrams illustrating an example of a method for producing the wire harness in FIG. 1.

A wire harness 10 according to an embodiment includes an insulated wire 1 whose conductor 8 is partially exposed at an intermediate portion of the wire in its longitudinal direction, and insulated wires 2 and 3 whose conductors 8 are partially exposed at an end portion of the respective wires in their longitudinal direction, and has an exposed conductor portion 5 formed of a bundle of the exposed conductors 8 of the plurality of insulated wires 1 to 3 and including a splice portion 4 in which the partially exposed conductors 8 of the plurality of insulated wires 1 to 3 are joined together. Moreover, the wire harness 10 has a waterproofing structure in which an outer peripheral surface of the exposed conductor portion 5 and outer peripheral surfaces of coating material end portions 1a to 3a and 1b adjacent to the exposed conductor portion 5, of the insulated wires 1 to 3 are continuously covered with a waterproofing agent 6. Thus, the intrusion of water from outside the outer peripheral surface of the exposed conductor portion 5 can be suppressed. A film-like protective material (protective film 7) is disposed on the outer periphery of the waterproofing agent 6 in a state in which it is in close contact with the waterproofing agent 6 over the entire outer periphery thereof. Thus, the intrusion of water from outside the outer peripheral surface of the exposed conductor portion 5 can be suppressed even more. Gaps between adjacent insulated wires 1 and 2, 2 and 3, as well as 3 and 1 of the plurality of insulated wires 1 to 3 are sealed with the waterproofing agent 6 at the coating material end portions 1a to 3a adjacent to the exposed conductor portion 5. Thus, the intrusion of water from the gaps between the insulated wires 1 and 2, 2 and 3, as well as 3 and 1 can be suppressed.

The conductors 8 of the insulated wires 1 to 3 are each constituted by a bundle of a plurality of strands 8a. The plurality of strands 8a may be twisted together and constitute a twisted wire, or may not be twisted together. The insulated wires 1 to 3 with such a configuration each contain air between the coating material 9 and the conductor 8 and between the strands 8a constituting the conductor 8. That is to say, the insulated wires 1 to 3 each contain air inside the coating material 9. A flow path through which gas flows is created in gaps between the strands 8a constituting the conductor 8, extending through each wire along the longitudinal direction.

Here, when the exposed conductor portion 5 is covered with the waterproofing agent 6, the waterproofing agent 6 penetrates into the gaps between the strands 8a constituting the conductors 8. When the waterproofing agent 6 has completely penetrated into the gaps between the strands 8a, the gaps between the strands 8a constituting the conductors 8 are completely filled with the waterproofing agent 6. In that case, the flow paths, which are created in the gaps between the strands 8a and through which gas flows, are completely blocked. In the preferred embodiment, the exposed conductor portion 5 is covered with the waterproofing agent 6 in such a manner that the gaps between the strands 8a constituting the conductors 8 are not completely filled with the waterproofing agent 6, and flow paths through which gas flows are secured in the gaps between the strands 8a. As a result, flow paths through which gas flows are created reaching from coating material end portions opposite to the respective coating material end portions 1a to 3a and 1b, which are adjacent to the exposed conductor portion 5, to the splice portion 4, in the gaps between the strands 8a constituting the conductors 8, and air inside each coating material 9 has an escape route to the exposed conductor portion 5. Accordingly, even when the insulated wires 1 to 3 are partially exposed to a high temperature, the air inside the coating materials 9 flows to the exposed conductor portion 5. Thus, a waterproofing failure caused by a rubber stopper of a waterproofing terminal coming off due to pressure applied by expanded air moving toward a connecting terminal opposite to the exposed conductor portion 5 can be suppressed.

It is sufficient that a flow path through which gas flows is secured in the gaps between the strands 8a of at least one insulated wire that is exposed to a high temperature, of the plurality of insulated wires 1 to 3. However, if flow paths are secured in two or more insulated wires of the plurality of insulated wires 1 to 3, even when one of the insulated wires is exposed to a high temperature, air inside the coating material 9 of this insulated wire flows to the inside of the coating material 9 of another insulated wire whose flow path is connected to the flow path of the insulated wire that is exposed to the high temperature. Thus, a waterproofing failure caused by a rubber stopper of a waterproofing terminal coming off due to pressure applied by expanded air moving toward a connecting terminal opposite to the exposed conductor portion 5 of the insulated wire that is exposed to a high temperature can be suppressed even more.

The insulated wire 1 of the plurality of insulated wires 1 to 3 is an insulated wire whose conductor 8 is partially exposed at an intermediate portion of the wire in the longitudinal direction, and the partially exposed conductor 8 is joined to the exposed conductors 8 of the other insulated wires 2 and 3 in the splice portion 4. In this insulated wire 1, if a flow path through which gas flows is secured in the gaps between the strands 8a, the insulated wire 1 has a flow path through which gas flows, the flow path being created in the gaps between the strands 8a that constitute the conductor 8 and reaching from one end to the other end of the wire in the longitudinal direction. In this case, even when the insulated wire 1 is partially exposed to a high temperature, air inside the coating material 9 flows to a portion of the insulated wire 1 that is not exposed to the high temperature, and thus, a waterproofing failure caused by a rubber stopper of a waterproofing terminal coming off due to pressure applied by expanded air moving toward a connecting terminal opposite to the exposed conductor portion 5 can be suppressed even more.

In order to prevent the waterproofing agent 6 from completely penetrating into the gaps between the strands 8a, the following methods can be adopted, for example. A waterproofing agent 6 with relatively high viscosity is used to cover the exposed conductor portion 5 and the like so as to prevent the waterproofing agent 6 from completely penetrating into the gaps between the strands 8a. In the case where a curable resin is used as the waterproofing agent 6, the curable resin is instantaneously cured so as to prevent the curable resin from completely penetrating into the gaps between the strands 8a. After the waterproofing agent 6 is applied to the exposed conductor portion 5 and the like, no external force or a reduced external force is applied in a direction in which the waterproofing agent 6 penetrates into the gaps between the strands 8a so as to prevent the waterproofing agent 6 from completely penetrating into the gaps between the strands 8a.

There is no limitation on the material for the coating materials 9 of the insulated wires 1 to 3, and an insulating resin material and the like can be used. Examples of the insulating resin material include a vinyl chloride resin and an olefin resin. The insulating resin material may contain an additive that is added to the coating materials. Examples of the additive include a flame retardant and an antioxidant.

The strands 8a constituting the conductors 8 are composed of one or two or more selected from metal strands and organic fibers. Copper, a copper alloy, aluminum, an aluminum alloy, and the like that have excellent conductivity are used as the metal strands. Moreover, stainless steel or the like may also be used as a reinforcing wire (tension member). A conductive organic fiber and a non-conductive organic fiber are used as the organic fibers. The conductive organic fiber may be a conductive fiber containing a conductive filler within the fiber or may be a conductive fiber obtained by coating the outer periphery of an organic fiber with a metal layer. The non-conductive organic fiber is suitably used as a reinforcing wire (tension member).

There is no limitation on the waterproofing agent 6, and an insulating resin material and the like that have excellent adhesive properties can be used. Examples of the waterproofing agent 6 include a thermoplastic resin, a thermosetting resin, a photo-curable resin, and a moisture-curable resin. Among these, curable resins are preferable from the viewpoint of obtaining an excellent balance between the ease of penetration into the outer periphery of the exposed conductor portion 5, the outer peripheries of the insulated wires 1 to 3, and the gaps between the insulated wires 1 and 2, 2 and 3, as well as 3 and 1 and the suppression of penetration into the gaps between the strands 8a constituting the conductors 8 of the insulated wires 1 to 3. Among curable resins, a photo-curable resin, which has a high curing rate, is the most preferable. When the waterproofing agent 6 is formed of a cured product of a photo-curable resin, since the photo-curable resin can be instantaneously cured through irradiation with light, the resin material can be intentionally prevented from penetrating into the gaps between the strands 8a constituting the conductors 8, and flow paths through which gas flows can be secured in the gaps between the strands 8a constituting the conductors 8. Examples of the photo-curable resin include ultraviolet-curable resins such as an ultraviolet-curable acrylic resin.

Preferably, the photo-curable resin has a viscosity within a range of 1.0 to 20 Pa·s at room temperature (25° C.). When the photo-curable resin has a viscosity of 1.0 Pa·s or greater, it is easy to suppress the photo-curable resin from completely penetrating into the gaps between the strands 8a constituting the conductors 8 before the time when the resin cures. When the photo-curable resin has a viscosity of 20 Pa·s or less, it is easy to ensure the ease of penetration into the outer periphery of the exposed conductor portion 5, the outer peripheries of the insulated wires 1 to 3, and the gaps between the insulated wires 1 and 2, 2 and 3, as well as 3 and 1. That is to say, it is easy to secure flow paths through which gas flows in the gaps between the strands 8a that constitute the conductors 8 while ensuring the waterproofing properties. The viscosity is more preferably 2.0 Pa·s or greater, and even more preferably 5.0 Pa·s or greater. Moreover, the viscosity is more preferably 15 Pa·s or less.

The splice portion 4 may be formed using various welding methods such as resistance welding, ultrasonic welding, and laser welding, or may be formed through crimping using a component such as a crimping terminal.

The protective film 7 is wrapped around the outer periphery of the waterproofing agent 6 and is thereby disposed on the outer periphery of the waterproofing agent 6 in a state in which it is in close contact with the waterproofing agent 6. In view of the ease of wrapping the protective film 7, the protective film 7 preferably has excellent flexibility. Therefore, a film made of resin is preferable. Examples of the resin used to form the protective film 7 include polyethylene, polyvinyl chloride, polyvinylidene chloride, polyvinylidene fluoride, polyester, polyethylene terephthalate, and nylon. In view of shape stability, hermetic sealing, and the like of the protective film 7 after being wrapped, the protective film 7 preferably has self-adhesive (pressure-sensitive adhesive) properties. From this view point, a vinyl chloride resin, a vinylidene chloride resin, a vinylidene fluoride resin, and the like are preferable as the resin forming the protective film 7.

In the case where a photo-curable resin is used as the waterproofing agent 6, it is preferable that the protective film 7 has excellent light-transmitting properties. For example, the protective film 7 preferably has an ultraviolet transmissivity of 50% or greater, and more preferably 90% or greater. In order to, for example, ensure excellent flexibility, the protective film 7 preferably has a thickness of 200 μm or less, and more preferably 150 μm or less. On the other hand, in order to, for example, ensure strength, the thickness of the protective film 7 is preferably 5 μm or greater.

Next, a method for producing the wire harness 10 will be described. FIGS. 3(*a*)-3(*c*) illustrate an example of the method for producing the wire harness 10.

As shown in FIG. 3(*a*), first, a wire bundle formed of the plurality of insulated wires 1 to 3 having the exposed conductor portion 5 including the splice portion 4 is prepared. This wire bundle can be formed by partially removing the coating materials 9 of the respective insulated wires 1 to 3 at predetermined positions to thereby partially expose the conductors 8 inside, and then joining the exposed conductors 8 together. Next, a protective film 7 that is large enough to cover a region containing the exposed conductor portion 5 and the coating material end portions 1*a* to 3*a* and 1*b* adjacent to the exposed conductor portion 5, of the insulated wires 1 to 3 is prepared, and the wire bundle is placed on the protective film 7 such that the exposed conductor portion 5 is positioned at the center of the protective film 7. Then, a predetermined amount of the waterproofing agent 6 is supplied centered about the exposed conductor portion 5.

Next, as shown in FIG. 3(*b*), the protective film 7 that is spread out is folded in half. At this time, whether the outer peripheral surface of the exposed conductor portion 5 and the outer peripheral surfaces of the coating material end portions 1*a* to 3*a* and 1*b* adjacent to the exposed conductor portion 5, of the insulated wires 1 to 3 are continuously covered with the waterproofing agent 6, and whether the gaps between adjacent insulated wires 1 and 2, 2 and 3, as well as 3 and 1 of the plurality of insulated wires 1 to 3 are sealed with the waterproofing agent 6 at the coating material end portions 1*a* to 3*a* adjacent to the exposed conductor portion 5 are confirmed visually or the like. A force is applied from outside the protective film 7, if necessary, so that the waterproofing agent 6 spreads through a desired region. If the waterproofing agent 6 is supplied only to the outer peripheral surface of the exposed conductor portion 5, it is necessary to apply a force from outside the protective film 7 in order to spread the waterproofing agent 6 to the coating material end portions 1*a* to 3*a* and 1*b* adjacent to the exposed conductor portion 5. When the waterproofing agent 6 is widely supplied to the exposed conductor portion 5 and also the coating material end portions 1*a* to 3*a* and 1*b* adjacent to the exposed conductor portion 5 from the beginning, the need to apply a force from outside the protective film 7 is eliminated, or a minimal force is sufficient, so that penetration of the waterproofing agent 6 into the gaps between the strands 8*a* can be suppressed. The protective film 7 that is folded in half is then wrapped around the outer periphery of the waterproofing agent 6 and the like. If the protective film 7 has self-adhesive (pressure-sensitive adhesive) properties, the wrapped-around state is maintained due to the self-adhesive (pressure-sensitive adhesive) properties. Moreover, a hermetically sealed state is achieved due to the adhesive properties of overlapping portions of the film. Thus, the waterproofing agent 6 is kept inside the protective film 7.

Next, as shown in FIG. 3(*c*), the waterproofing agent 6 is cured by irradiating the waterproofing agent 6 with light using a light irradiation apparatus such as an ultraviolet irradiation apparatus. Since the waterproofing agent 6 cures instantaneously, penetration of the waterproofing agent 6 into the gaps between the strands 8*a* can be suppressed by curing the waterproofing agent 6 immediately after being supplied. Thus, the wire harness 10 is obtained.

With the wire harness 10 having the above-described configuration, the outer peripheral surface of the exposed conductor portion 5 and the outer peripheral surfaces of the coating material end portions 1*a* to 3*a* and 1*b* adjacent to the exposed conductor portion 5, of the insulated wires 1 to 3 are continuously covered with the waterproofing agent 6, and the gaps between adjacent insulated wires 1 and 2, 2 and 3, as well as 3 and 1 of the plurality of insulated wires 1 to 3 are sealed with the waterproofing agent 6 at the coating material end portions 1*a* to 3*a* adjacent to the exposed conductor portion 5. Thus, the intrusion of water into the exposed conductor portion 5 from outside the coating materials 9 can be suppressed, and the waterproofing properties are ensured. In addition, at least one insulated wire of the plurality of insulated wires 1 to 3 has, in the gaps between the strands 8*a* constituting the conductor 8, a flow path through which gas flows, the flow path reaching from the coating material end portion opposite to the coating material end portion adjacent to the exposed conductor portion 5 to the splice portion 4. Thus, air inside the coating material 9 of this insulated wire has an escape route to the exposed conductor portion 5. Accordingly, even when this insulated wire is exposed to a high temperature, the air inside the coating material 9 flows to the exposed conductor portion 5, and a waterproofing failure caused by a rubber stopper of a waterproofing terminal coming off due to pressure applied by expanded air moving toward a connecting terminal opposite to the exposed conductor portion 5 can be suppressed.

Although an embodiment has been described in detail above, the invention is not limited to the foregoing embodiment, and various modifications can be made without departing from the gist of the invention.

For example, in the foregoing embodiment, the insulated wire 1, of the plurality of insulated wires 1 to 3 constituting the wire harness 10, is an insulated wire whose conductor 8 is partially exposed at the intermediate portion of the wire in the longitudinal direction, and the partially exposed conductor 8 is joined to the exposed conductors 8 of the other insulated wires 2 and 3 in the splice portion 4. That is to say, a waterproofing structure of an intermediate splice portion is obtained. However, the present invention may also be applied to a waterproofing structure of a so-called end splice portion, in which the conductor 8 of the above-described insulated wire 1 is also partially exposed at an end portion of the wire in its longitudinal direction.

Moreover, in the foregoing embodiment, a film-like protective material is used as the protective material that covers the outer periphery of the waterproofing agent 6. However, a tubular protective material (seamless member without seams in its circumferential direction) may also be used. In this case, the waterproofing agent 6 will be disposed inside the tubular protective material. Taking the ease of disposing the waterproofing agent 6 and the hermetic sealing ability into account, it is preferable to use a tubular member made of a resin with heat-shrinkability, for example, as the protective material.

Furthermore, in the foregoing embodiment, the production method is described using an example in which a photo-curable resin is used as the waterproofing agent 6. However, other curable resins and thermoplastic resins may also be used as the waterproofing agent 6. Also, in the production example illustrated in FIGS. 3(*a*)-3(*c*), the wire bundle is placed on the protective film 7 first. However, the waterproofing agent 6 may be supplied onto the protective film 7 first, and the wire bundle may be placed on the waterproofing agent 6 afterward.

EXAMPLES

Hereinafter, examples and comparative examples will be described.

Examples 1 to 4 and Comparative Examples 1 to 3

A wire harness was produced according to the process illustrated in FIGS. 3(*a*)-3(*c*). A photo-curable resin was used as the waterproofing agent. The time period from when the waterproofing agent was supplied to when light irradiation was performed was used as the penetration time. With regard to the supply area of the waterproofing agent, the waterproofing agent was widely supplied to the exposed conductor portion and the coating material end portions adjacent to the exposed conductor portion from the beginning. No external force was applied from outside the protective film to the waterproofing agent before and after wrapping the protective film, except for the force that was applied due to the wrapping operation.

Photo-curable resin 1 (UV-curable resin 1): "TB3017D" manufactured by ThreeBond; viscosity: 13 Pa·s (25° C.)

Photo-curable resin 2 (UV-curable resin 2): "TB3177" manufactured by ThreeBond; viscosity: 1.2 Pa·s (25° C.)

Protective film: "#244J" manufactured by DENKA UV irradiation: UV irradiation at 1 W/cm²×3 s was performed twice for the front side and the rear side.

Evaluation of Waterproofing Properties

Figure 4A:
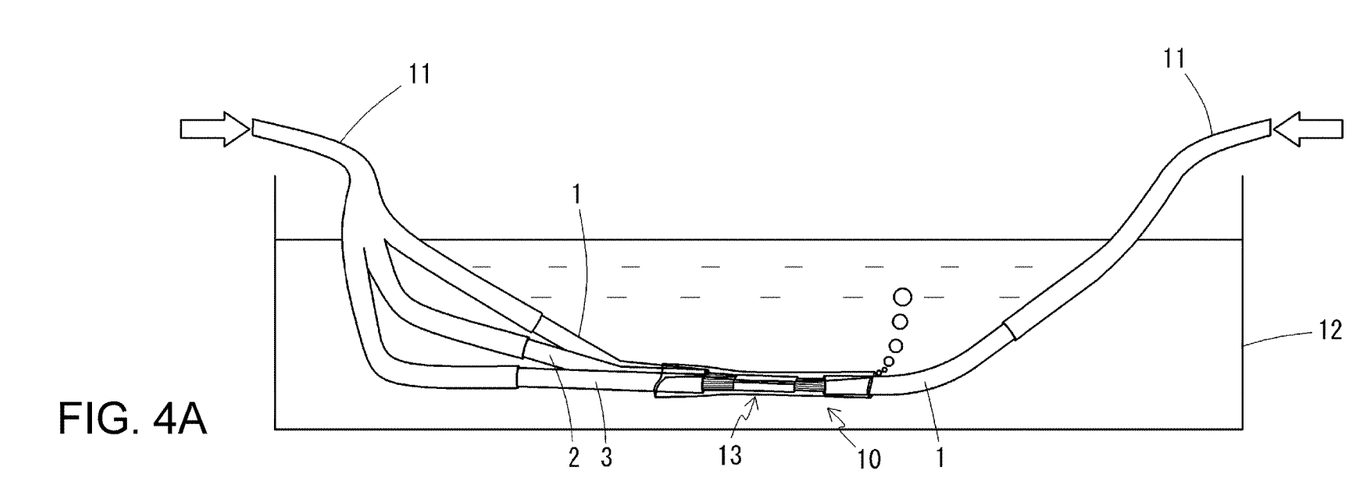
FIGS. 4(a) and 4(b) show explanatory diagrams illustrating a method for evaluating waterproofing properties and water-blocking properties.

As shown in FIG. 4(*a*), rubber tubes 11 were inserted into end portions of the insulated wires 1 to 3 of each wire harness 10, and the entire wire harness 10 was placed in a water tank 12. In this state, 100 kPa of air pressure was applied from each of the rubber tubes 11 attached to opposite ends. If no air leaked from a waterproofing structure portion 13 while air pressure was applied for 30 seconds, the wire harness 10 was evaluated as acceptable (○), and if air leaked, the wire harness 10 was evaluated as not acceptable (x).

Evaluation of Water-Blocking Properties

Figure 4B:
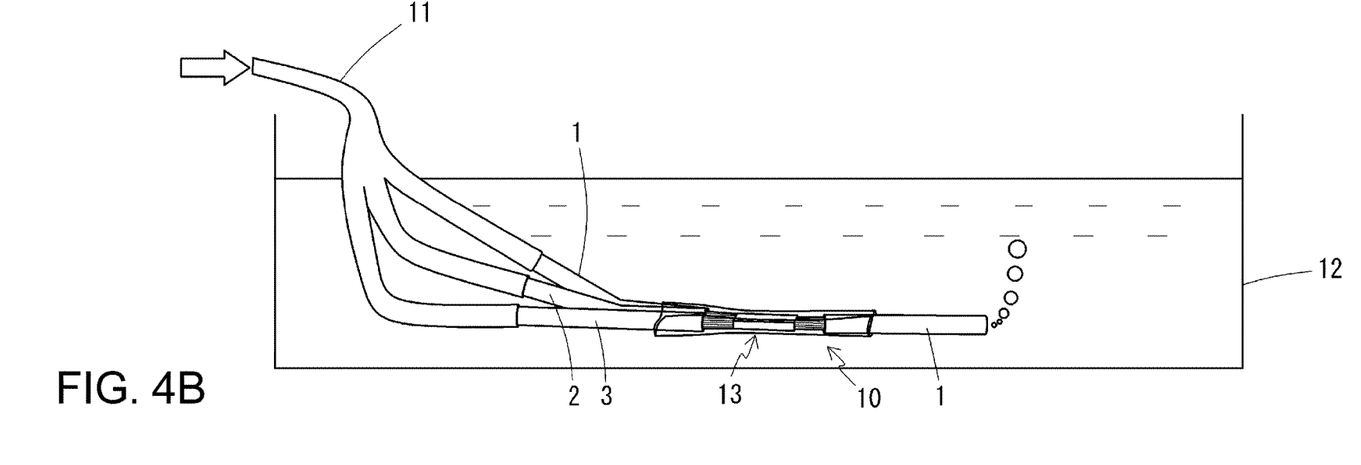

As shown in FIG. 4(*b*), with respect to the wire harnesses that were evaluated as acceptable in the evaluation of waterproofing properties, the rubber tube 11 at one end of each wire harness was removed, and 100 kPa of air pressure was applied from the rubber tube 11 on the other end side. If air leaked from the end of the insulated wire 1 without the rubber tube 11 while air pressure was applied for 30 seconds, the wire harness was identified as having flow paths in gaps between the strands constituting the conductors and evaluated as acceptable (○). If no air leaked, the wire harness was evaluated as not acceptable (x). This evaluation of water-blocking properties was performed as the evaluation of confirmation of flow paths.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Photo-curable resin 1 (parts by mass) | 100 | 100 | — | — | 100 | 100 | — |
| Photo-curable resin 2 (parts by mass) | — | — | 100 | 100 | — | — | 100 |
| Penetration time (s) | 10 | 120 | 10 | 60 | 3 | 1200 | 240 |
| Waterproofing properties | ○ | ○ | ○ | ○ | x | ○ | ○ |
| Water-blocking properties (properties of not blocking water) | ○ | ○ | ○ | ○ | — | x | x |

In Comparative Example 1, a resin with relatively high viscosity was used, and the soaking time was short. Accordingly, the resin cured in a state in which the resin had not sufficiently spread through the outer periphery of the exposed conductor portion and the outer peripheries of the coating material end portions adjacent to the exposed conductor portion. Thus, the waterproofing properties were insufficient. In Comparative Example 2, a resin with relatively high viscosity was used, but the soaking time was long. Accordingly, the resin excessively penetrated into the gaps between the strands constituting the conductors, and the gaps were completely filled with the resin. Thus, although sufficient waterproofing properties were obtained, flow paths through which gas flows were not secured in the gaps between the strands. In Comparative Example 3, a resin with relatively low viscosity was used, and the soaking time was long. Accordingly, the resin excessively penetrated into the gaps between the strands constituting the conductors, and the gaps were completely filled with the resin. Thus, although sufficient waterproofing properties were obtained, flow paths through which gas flows were not secured in the gaps between the strands.

In contrast, in each of Examples 1 and 2, a resin with relatively high viscosity was used, and the soaking time was adequate. Accordingly, the resin cured in a state in which the waterproofing agent had sufficiently spread through the outer periphery of the exposed conductor portion and the outer peripheries of the coating material end portions adjacent to the exposed conductor portion, and sufficient waterproofing properties were obtained. Moreover, since the soaking time was adequate, the waterproofing agent cured without excessively penetrating into the gaps between the strands constituting the conductors, and sufficient flow paths through which gas flows were secured in the gaps between the strands. In each of Example 3 and 4, a resin with relatively low viscosity was used, and the soaking time was adequate. Accordingly, sufficient waterproofing properties were also obtained, and sufficient flow paths through which gas flows were secured between the strands. Therefore, if the wire harness of any of the examples is used, even when one of the insulated wires constituting the wire harness is exposed to a high temperature, air inside the coating material flows to the exposed conductor portion and the other insulated wires, and a waterproofing failure caused by a rubber stopper of a waterproofing terminal coming off due to pressure applied by expanded air moving toward a connecting terminal opposite to the exposed conductor portion can be suppressed.

Although embodiments of the invention has been described in detail above, the invention is not limited to the foregoing embodiments, and various modifications can be made without departing from the gist of the invention.

LIST OF REFERENCE NUMERALS

10 Wire harness
1 to 3 Insulated wire
4 Splice portion
5 Exposed conductor portion
6 Waterproofing agent
7 Protective film
8 Conductor
8a Strand
9 Coating material

The invention claimed is:

1. A wire harness comprising:
an exposed conductor portion, including a splice portion, where a bundle of partially exposed conductors of a plurality of insulated wires are joined together;
each of the plurality of insulated wires configured with a respective coating material, each of the respective coating materials having a respective coating material end portion adjacent to the exposed conductor portion; and
a waterproofing agent continuously covering outer peripheral surfaces of coating material end portions adjacent to the exposed conductor portion; wherein
a gap between adjacent insulated wires of the plurality of insulated wires is sealed with the waterproofing agent at the respective coating material end portions adjacent to the exposed conductor portion, and
at least one insulated wire of the plurality of insulated wires has a flow path through which gas flows, the flow path being created in gaps between strands that constitute the conductor of the insulated wire, the flow path extending between: (i) a first coating material end portion and the splice portion, and (ii) the splice portion and a second coating material end portion that is adjacent to the exposed conductor portion.

2. The wire harness according to claim 1, wherein at least one insulated wire of the plurality of insulated wires is an insulated wire whose conductor partially exposed at an intermediate portion of the wire in its longitudinal direction is joined to the exposed conductor of another insulated wire in the splice portion, and the insulated wire has a flow path through which gas flows, the flow path being created in gaps between strands that constitute the conductor and reaching from one end to another end of the wire in the longitudinal direction.

3. The wire harness according to claim 2, wherein the at least one insulated wire of the plurality of insulated wires that has the flow path, includes two or more insulated wires of the plurality of insulated wires.

4. The wire harness according to claim 3, wherein a film-like or tubular protective material is disposed over the entire outer periphery of the waterproofing agent continuously covering the outer peripheral surface of the exposed conductor portion and the outer peripheral surfaces of the coating material end portions adjacent to the exposed conductor portion, of the insulated wires in a state in which the film-like or tubular protective material is in close contact with the waterproofing agent.

5. The wire harness according to claim 4, wherein the waterproofing agent is formed of a cured product of a photo-curable resin.

* * * * *